US005826436A

United States Patent [19]
Scaringe et al.

[11] Patent Number: 5,826,436
[45] Date of Patent: Oct. 27, 1998

[54] ADDITIVE FOR IMPROVING PERFORMANCE AND COOLING CAPACITY OF VAPOR COMPRESSION SYSTEMS

[75] Inventors: Robert P. Scaringe, Rockledge; Lawrence R. Grzyll, Merritt Island, both of Fla.

[73] Assignee: Mainstream Engineering Corporation, Rockledge, Fla.

[21] Appl. No.: 707,257

[22] Filed: Sep. 3, 1996

[51] Int. Cl.[6] .................................................. F25D 15/00
[52] U.S. Cl. ................................ 62/114; 62/112; 252/67; 252/69
[58] Field of Search ............................. 62/102, 112, 114, 62/476, 101; 252/67, 68, 69

[56] References Cited

U.S. PATENT DOCUMENTS

| | | | |
|---|---|---|---|
| 4,321,799 | 3/1982 | Pierotti et al. .......................... 62/112 |
| 4,454,052 | 6/1984 | Shoji et al. . |
| 4,553,408 | 11/1985 | Cross et al. . |
| 4,559,154 | 12/1985 | Powell . |
| 4,656,839 | 4/1987 | Cross et al. . |
| 4,927,554 | 5/1990 | Jolley et al. . |
| 4,941,986 | 7/1990 | Jolly . |
| 4,963,280 | 10/1990 | Wilkins et al. .......................... 252/58 |
| 4,963,282 | 10/1990 | Jolley et al. . |
| 4,985,169 | 1/1991 | Rolland et al. . |
| 4,990,277 | 2/1991 | Rolland et al. . |
| 5,008,028 | 4/1991 | Jolley et al. . |
| 5,009,085 | 4/1991 | Ramshaw et al. . |
| 5,158,698 | 10/1992 | Jolley et al. . |
| 5,194,171 | 3/1993 | Jolley . |
| 5,302,305 | 4/1994 | Jolley et al. . |
| 5,582,020 | 12/1996 | Scaringe et al. ........................ 62/102 |

OTHER PUBLICATIONS

"Absorption system based on the refrigerant R134a," L. Borde et al., Int. J. Refrig., vol. 18, No. 6, pp. 387–394.

"Solubility of HFC–134a Refrigerant in Glycol–Type Compounds: Effects of Clycol Structure," Spyros I. Tseregounis et al., AIChE Journal, Apr. 1994, vol. 40, No. 4, pp. 726–737.

"Solubility of Refrigerants 11, 21, and 22 in Organic Solvetns Containing a Nitrogen Atom and in Mixtures of Liquids," A. Thieme et al., ASHRAE Transaction, 72,432, 1961, pp. 431–440.

"New Working Pairs for Medium and High Temperature Industrial Absorption Heat Pumps," M. Narodoslawsky et al., Heat Recovery Systems & CHP 1988, vol. 8, No. 5, pp. 459–468.

"Absorption heat pump perfomrance for different types of solution," H. Perez–Blanco, vol. 7, No. 2, Mar. 1984, pp. 115–122.

"Chlo ofluorohydrocarbons in tetraethylene glyco dimethyl ether," S.V.R. Mastrangelo, ASHRAE.

"Solubility of Haolgenated Hydrocarbon Refrigerants in Organic Solvents," G.F. Zellhoefer, Industrial & Engineering Chemistry, May 1937, pp. 549–551.

"Hydrogen Bonds Involving the C—H Link. The Solubility of Haloforms in Donor Solvents," G. F. Zellhoefer et al., Jun. 1938, pp. 1337–1343.

"The Heats of Mixing of Haloforms and Plyethylene Glycol Ethers," G. F. Zellhoefer et al., Jun. 1938, pp. 1343–1345.

"Solubility of Chlorofluoromethanes in Nonvolatile Polar Organic Solvents," L. F. Albright, et al., A.I. ChE. Journal, Nov. 1962, pp. 668–672.

"Selecting Refrigerant–Absorbent Fluid Systems for Solar Energy Utrilizaiton," Robert A. Macriss, ASHRAE Trans. Feb. 1976, pp. 975–988.

(List continued on next page.)

*Primary Examiner*—William Doerrler
*Attorney, Agent, or Firm*—Evenson, McKeown, Edwards & Lenahan, P.L.L.C.

[57] ABSTRACT

A performance enhancing additive is introduced into a vapor compression system used in cooling and the like. The additive is selected from a class of compounds, e.g. tetraglyme, and added in a predetermined concentration measured relative to the mass of the system's lubricant. The additive can be soluble or non-soluble in the lubricant used in the system's single-phase compressor. It can be added anywhere in the system to provide lower thermodynamic load on the system compressor.

21 Claims, 7 Drawing Sheets

OTHER PUBLICATIONS

"Solubility of Refrigerants 11, 21, and 22 in Organic Solvents Containing an Oxygen Atom," L. F. Albright et al., ASHRAE Trans., 66,423, 1960.

"Solubility of Mixtures of Regrigerants 12 and 22 in Organic Solvents of Low Volatility," ASHRAE Trans., 27–33 &1 (2), 1965.

Hydrogen Bonds Involving the C—H Link. VIII.[1]. The Solubilities of Completely Halogenated Methanes in Organic Solvents, M.J. Copley et al., vol. 61, Dec. 1939, pp. 3550–3552.

"Why Refrigerant 22 hsould be favored for Absorption refrigeration," B. J. Eiseman, Jr., ASHRAE Journal, Dec. 1959, pp. 43–48.

ADDITIVE FOR IMPROVING PERFORMANCE AND COOLING CAPACITY OF VAPOR COMPRESSION SYSTEMS

BACKGROUND AND SUMMARY OF THE INVENTION

The present invention relates to a performance enhancing additive, and more particularly, to an additive for a basic vapor compression (VC) system such as cooling, air conditioning, heat pump and refrigerant systems, which dramatically improve the system's coefficient and performance (COP) and cooling capacity by lowering the thermodynamic load on the system compressor via lower pressure ratio and/or pressure difference, and which avoids the need for the more complicated approaches used in the past in enhance cooling capacity and performance.

FIG. 1 is a schematic diagram of a known VC or vapor-compression system. Commercial heat pumps and the like typically utilize other components in addition to these basic components shown in FIG. 1 such as oil separators, suction-line (liquid) accumulators, liquid receivers, mufflers, recuperative heat exchangers, reversing valves, high pressure and low pressure safety switches, thermal overload protection, and filter-driers.

A vapor compression heat pump utilizes a refrigerant evaporating at low pressure and low temperature to provide the cooling. This refrigerant vapor is then superheated slightly in the evaporator (to avoid sending incompressible liquid to the compressor) and compressed by the compressor to a higher pressure, thereby raising the condensation temperature so that the heat can be rejected to the environment as the refrigerant condenses to a liquid state. This liquid is then throttled in an expansion device to a two-phase mixture which enters the evaporator to complete the process. In many cases, the compressor which provides the compression of the refrigerant must be lubricated to maximize compressor life and a lubricant compatible with the refrigerant and the materials of construction must be utilized. The proper lubricant to use for a particular type of refrigerant, compressor configuration, and temperature range is well known in the art. For example, in a VC system using HFC-134a refrigerant, it has been proposed to used tetraglyme by itself as the lubricant, but tests have demonstrated that it is not an acceptable lubricant.

It is also well known that the lubricant used in the VC compressor becomes entrained in the refrigerant discharged from the compressor outlet and travels throughout the system. The refrigerant traveling throughout the system typically has an oil concentration of up to 5% by weight, the exact oil concentration being circulated being dependent on the compressor design, plumbing considerations, and the presence or absence of an oil separator, which is located directly downstream of the compressor outlet and returns the oil to the compressor.

Numerous attempts have been made in the past to improve the performance characteristics of the VC system. Each such attempt, however, introduces some additional complication or disadvantage into the system.

For example, FIG. 2 is a schematic diagram of a known heat pump system using a "vapor-compression cycle with solution circuit" (VCSC) to improve performance. A vapor-compression heat pump is a heat pump that uses the physical characteristic that the temperature at which evaporation (a cooling process) occurs and the temperature at which condensation (a heat rejection process) occurs are affected by pressure, so the working fluid (refrigerant) is compressed to alter the evaporation and condensation temperatures so as to pump heat. In this type of cycle, the traditional single-component refrigerant evaporator is replaced with a generator, where a liquid-phase two-component absorbent/refrigerant solution enters and the desorption of some or all or the generated refrigerant vapor from the two-component solution provides the cooling. In this system, the liquid and vapor are physically separated. This process absorbs the heat of vaporization of the refrigerant and the heat of dissolution. Various absorbent and refrigerant pairs have been proposed, with tetraglyme being one such absorbent in connection with various halocarbon refrigerants.

The VCSC generator is a combination of a heat exchanger and a liquid separator. The superheated vapor which is driven off and separated is compressed to higher pressure and the remaining strong liquid solution (a mixture of absorbent and refrigerant liquid) is pumped to a higher pressure. The separate liquid and vapor streams at the higher pressure are then combined in an absorber, and the absorption of the refrigerant vapor into the strong liquid solution rejects heat to the environment (heat of condensation+heat of solution).

The VSCS absorber is a heat exchanger for transferring heat to the environment and a device for exposing the liquid solution to the vapor. Typically the absorber is a falling film of liquid solution, which film passes through the vapor as it falls. The mixture accumulates at the bottom of this falling film where a heat-transfer coil (pipe) transfers the heat out of the solution and into a pumped coolant which flows through this cooling coil.

After leaving the VSCS absorber, the pressure of the resulting weak solution of absorbent and refrigerant is then dropped, via the throttling valve, and the mixture reenters the generator to complete the process. The vapor-compression cycle with solution circuit has improved COP because the latent heat has increased, thereby increasing the cooling capacity, for very little additional work. The work of a liquid pump is small, relative to the work of the compressor, because liquids are essentially incompressible.

The vapor-compression with solution circuit system is not practical, however, because it requires a balance between the liquid solution flow and compressed vapor flows which combine in the absorber. The flow rates of the vapor and the liquid solution change with cooling temperature and load, and the pump and compressor typically have different flow verses pressure characteristics. The end result is that under typical variable loads, the compressor and pump discharge pressures do not always match causing significantly reduced performance or even temporary failure of the system.

Complex pump, compressor, and/or by-pass control logic have not effectively resolved this very volatile control problem, and these control methods reduce performance and significantly increase complexity and cost. Another significant shortcoming of the VCSC cycle is that the absorber must expose the vapor to the liquid solution, via a falling film or some other mechanical way to allow for absorption of the vapor in the solution. This, in turn, requires a significant amount of space, thereby requiring large absorbers. Similarly, generators must provide sufficient free surface to allow for desorption of vapor out of the solution, and again this requires a significant amount of space. Generators, which are not quite as large as absorbers, are the second largest component in the system. Large size in such systems means heavier and more expensive systems.

Mainstream Engineering Corporation, the assignee of the present invention, has developed a substantially improved modification of the VC heat pump system with solution circuit shown in FIG. 2. This improved system which is shown in FIG. 3 is referred to as a chemical-mechanical heat pump (CMHP). U.S. patent application Ser. No. 08/347,095, filed Nov. 23, 1994, now U.S. Pat. No. 5,582,020, is incorporated herein by reference.

The CMHP has the basic benefits of the VSCS but the basic components of the simpler vapor-compressor systems. Instead of physically separating the refrigerant from the solution, however, the CMHP uses a special compressor to compress the two-phase (liquid-vapor) two-component solution together.

The low temperature generator heat exchanger in the CMHP does not also need to function as a separator, and the high pressure heat rejection absorber heat exchanger does not need to distribute the vapor to the solution because they always remain in contact. After leaving the high pressure/high temperature heat exchanger (and rejecting heat to the surroundings), the single-phase two-component liquid solution (absorbent plus refrigerant) enters the throttling valve (expansion valve). The pressure is dropped, and the solution enters the low pressure heat exchanger where the heat transfer into the solution provides the cooling and drives some of the refrigerant out of solution and into the vapor phase. The superheated refrigerant and liquid solution mixture of the CMHP system is not separated, as it would be the VCSC, but instead is kept together and compressed in a two-phase (liquid-vapor) compressor to the higher pressure.

Typically compressors compress only a vapor and in fact the inlet vapor to a compressor is usually superheated to avoid any knocking caused by the attempt to compress a liquid. The CMHP compressor configuration is unique in that it must compress the liquid vapor mixture without knocking and no lubricant is used in the system.

The CMHP working fluid has greater latent heat capability when compared to a pure working fluid because a pure fluid (refrigerant) has only the latent heat of vaporization whereas this absorbent-refrigerant fluid also has the heat of vaporization and the heat of solution. The increase in latent heat increases the cooling capacity significantly, and the additional work to compress the liquid solution is less than the work required to compress the same amount of vapor. Efforts at Mainstream Engineering Corporation have demonstrated about a 7% to 10% boost in $COP_c$ for the optimum concentration of adsorbent mixed into the refrigerant charge.

FIG. 4 is a graph of CMHP performance data showing $COP_c$ verses average temperature lift for various solution concentrations from 0% absorbent (a typical vapor compression cycle) to 20% absorbent (percentage of absorbent plus refrigerant mass). The specific refrigerant was chlorodifluoromethane (HCFC-22), and the absorbent was N,N-dimethylformamide (DMF). Of course, numerous other possible absorbents and refrigerants can be used in the CMHP. The performance data demonstrates the benefit of using the liquid solution and also that there is an optimum concentration of liquid solution. For example, for the tests in FIG. 4, increasing the solution concentration from 0% solution) to 14% absorbent increases the $COP_c$. Further increasing solution concentrations above 14% resulted in reduced performance.

Attempts have also been made to improve cooling performance via either additives or improved lubrication to reduce the friction loss in the compressor. For example, with regard to the former of the two approaches, U.S. Pat. No. 4,963,280 describes a composition for improving the energy efficiency of heat pumps by improving the heat transfer in the evaporator and condenser. A polar molecule which is a liquid halogenated alpha-olefin or liquid halogenated paraffin is postulated to form a Van der Waals bond with the metal surface of the heat exchanger thereby assumedly reducing the thermal boundary layer. This approach attempts to boost performance through a significant improvement in the evaporative or condensation heat transfer, but has not proved to provide substantial improvement in performance.

During our investigations of usable absorbents for the CMHP, we discovered that some of the absorbents are soluble in polyol ester (POE) lubricants normally used in HFC-134a vapor-compression (VC) systems and do not degrade the lubrication performance of the lubricant any more than the refrigerant itself degrades lubrication performance. One of ordinary skill would have assumed that the addition of absorbent into the VC system using a conventional compressor would have no beneficial effect on cooling capacity or performance, particularly because lubricant lowers heat transfer in the evaporator and condenser. Every effort is usually made to keep the lubricant in the compressor region. Because the lubricant is conventionally added to the VC system for the compressor itself and is not intended to serve a purpose anywhere else in the system, an effort is made through various complicated structural systems to keep the lubricant in the region of the compressor itself as much as possible.

The lubricant concentration in the refrigerant traveling throughout the VC system is typically in the 1–5% range. Because of this low amount, the concentration of additive that is present in the refrigerant/additive/lubricant mixture that travels throughout the system is significantly less than the concentration of absorbent normally used in the CMHP. Because of this reduced additive/refrigerant concentration, one would be expect the COP boost attributable to the additive/absorbent also to be significantly less. We have discovered, however, that certain concentrations of absorbent-type additives dramatically increase the COP boost and cooling capacity. COP is here defined as the usefully heating or cooling of the system divided by the energy required to obtain the heating or cooling. $COP_c$ is the coefficient of performance in cooling; $COP_h$ is the coefficient of performance in heating.

It is, therefore, an object of the present invention to provide improved performance for a vapor compression (VC) system with a very simple expedient. It is yet another object of the present invention to achieve dramatic increases in cooling capacity and performance in a VC system without the need for a solution circuit or for any complex apparatus of the type needed for the known VCSC system or CMHP system.

We have achieved these objects with our discovery that the addition of certain weight concentrations of selected additives in the basic VC system provides substantial improvements in $COP_c$ and $COP_h$.

An additive in accordance with the present invention has an atom which is an electron donor for hydrogen bonding with a refrigerant. Typical compound families with this feature include ethers, esters, ketones, aldehydes, anhydrides, amines, and amides. However, we have found that families with OH groups, such as alcohols, glycols, and carboxylic acids, tend to hydrogen bond with themselves rather than with the refrigerant and do not achieve the system performance benefits of the present invention.

Examples of additives for carrying the present invention include, but are not limited to the following:

tetraethylene glycol dimethyl ether (tetraglyme)
triethylene glycol dimethyl ether
diethylene glycol diethyl ether
butyric anhydride
tetramethylurea
ethylene glycol diacetate
N,N-dimethylformamide
N,N-dimethylacetamide
N,N-diethylformamide
2-octanone According to another aspect of the present invention, the refrigerant is a halogenated hydrocarbon having at least one hydrogen atom present in its chemical structure, such as HFC-134a or HCFC-22.

Another feature of the present invention is that the relative volatility between the additive and refrigerant should be significant, such that the additive can be considered non-volatile. We have found that this criteria can assessed via boiling point difference between the additive and the refrigerant.

Yet another feature of the present invention is that freezing point of the additive should be well below the lowest temperature in the cycle. Moreover, the additive should be of low toxicity and low flammability, and should also be environmentally acceptable.

BRIEF DESCRIPTION OF THE DRAWINGS

These and other objects, features and advantages of the present invention will become more apparent from the following detailed description of our discovery when taken in conjunction with the accompanying drawings wherein.

DETAILED DESCRIPTION OF THE DRAWINGS

With our discovery that certain additives, some of which are soluble in the lubricants normally used in vapor-compressor system, we theorized that by adding this additive to the system, the additive would then travel throughout the system as part of, or mixed with, the lubricant that normally travels throughout the system. The additive can, but need not be, soluble in the lubricant and thus, like the lubricant, remains a liquid throughout the system. Therefore, regardless of how the additive is put into the system, e.g. in the lubricant or elsewhere, it will become well mixed with the lubricant and travel with the lubricant as a liquid throughout the system. The additive would then be available to desorb refrigerant in the evaporator and absorb refrigerant in the condenser is a manner similar to the CMHP, except that the compressor and all the other components of the system would be identical to the vapor compression (VC) components. In the CMHP, however, a special, more expensive two-phase compressor is required and no lubricant is used, whereas in the VCSC a more complicated separate solution circuit is used.

Remarkably, our experiments have demonstrated, based upon this discovery, that a dramatic increase occurs in the $COP_c$, as high as 10%, when using the additive in a concentration measured relative to the mass of the lubricant. In one series of experiments, 1,1,1,2-tetrafluoroethane (HFC-134a) is used as the refrigerant, Mobil® Arctic EAL 22CC polyol ester (POE) as the lubricant, and tetraethylene glycol dimethyl ether (tetraglyme) as the additive which is soluble in both the POE lubricant and HFC-134a. The test system consisted of a commercial ¾ hp semi-hermetic reciprocating compressor, a pressure-regulating expansion device, an air-cooled condenser, and a liquid-refrigerant evaporator.

Figure 1:
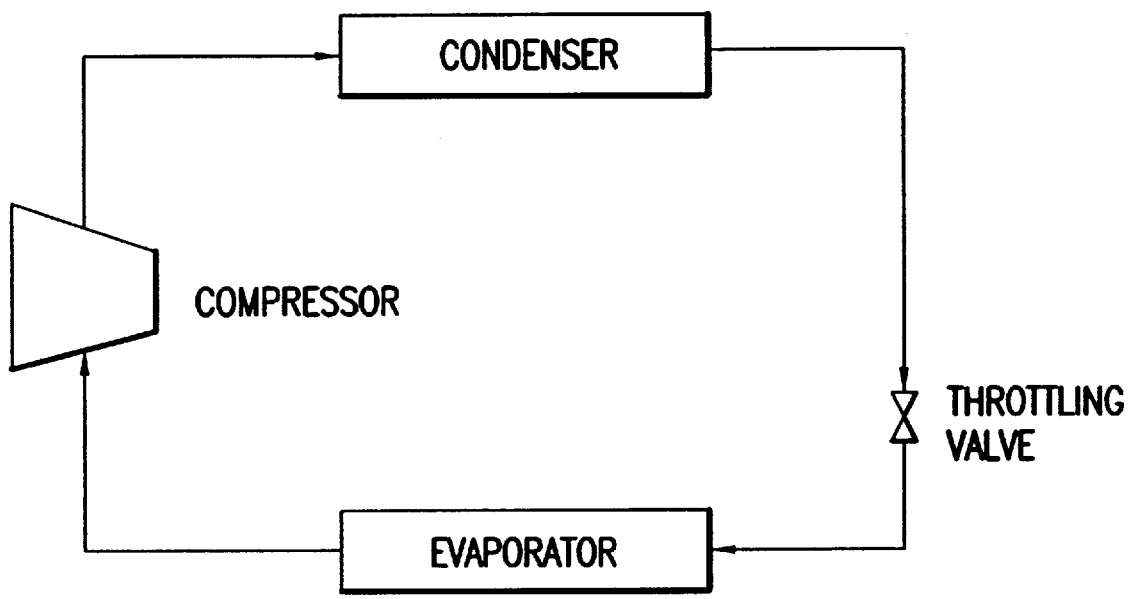
FIG. 1 is a schematic diagram of conventional vapor compression system discussed above.
Figure 2:
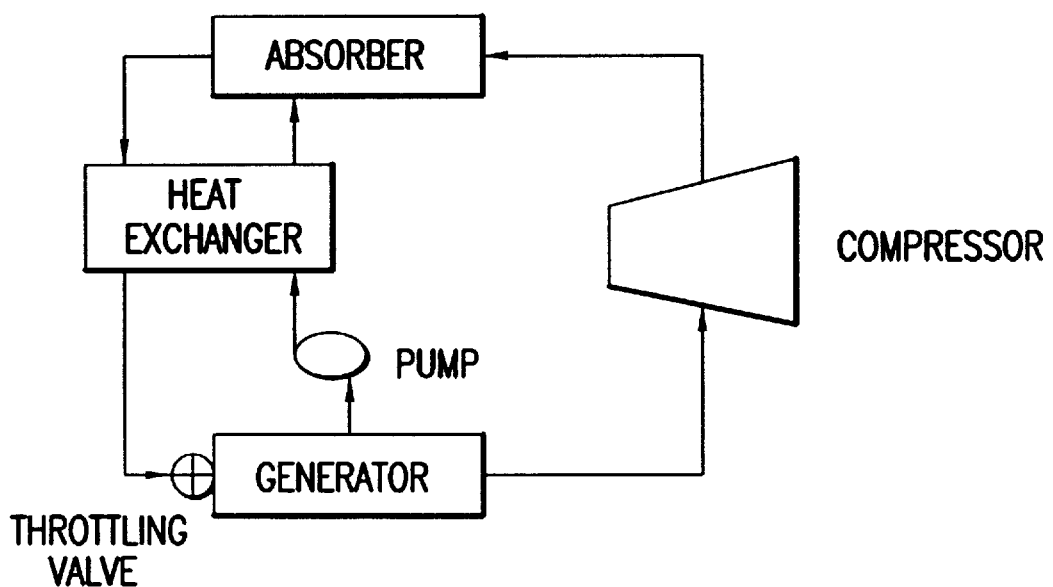
FIG. 2 is a schematic diagram of conventional system using vapor-compression cycle with solution circuit discussed above.
Figure 3:
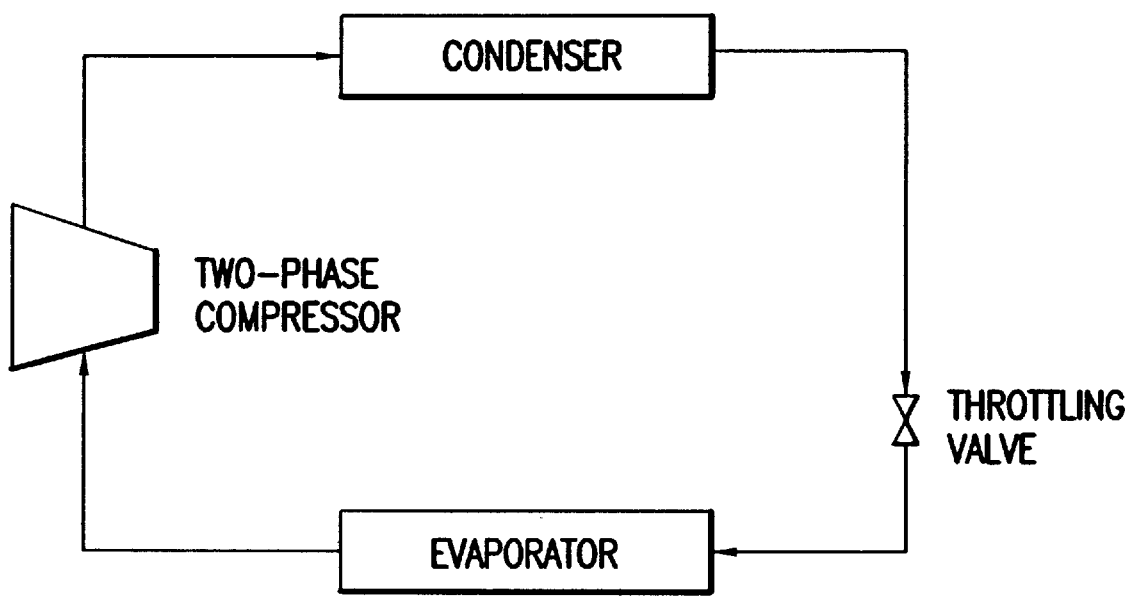
FIG. 3 is a schematic diagram of chemical-mechanical heat pump system (CMHP) discussed above.
Figure 4:
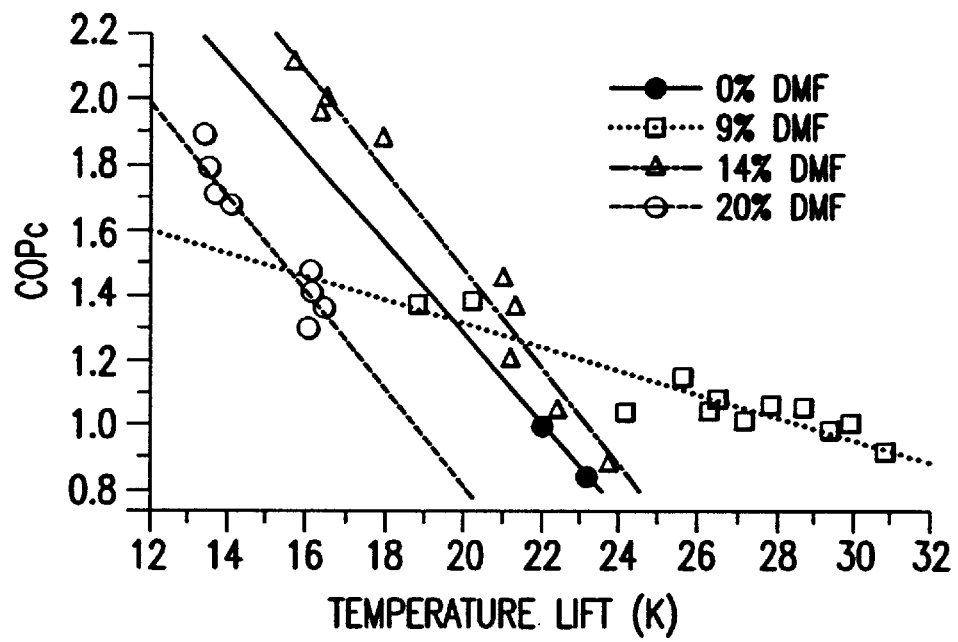
FIG. 4 is a graph showing the relationship between $COP_c$ and solution concentration for the CMHP system discussed above.
Figure 5:
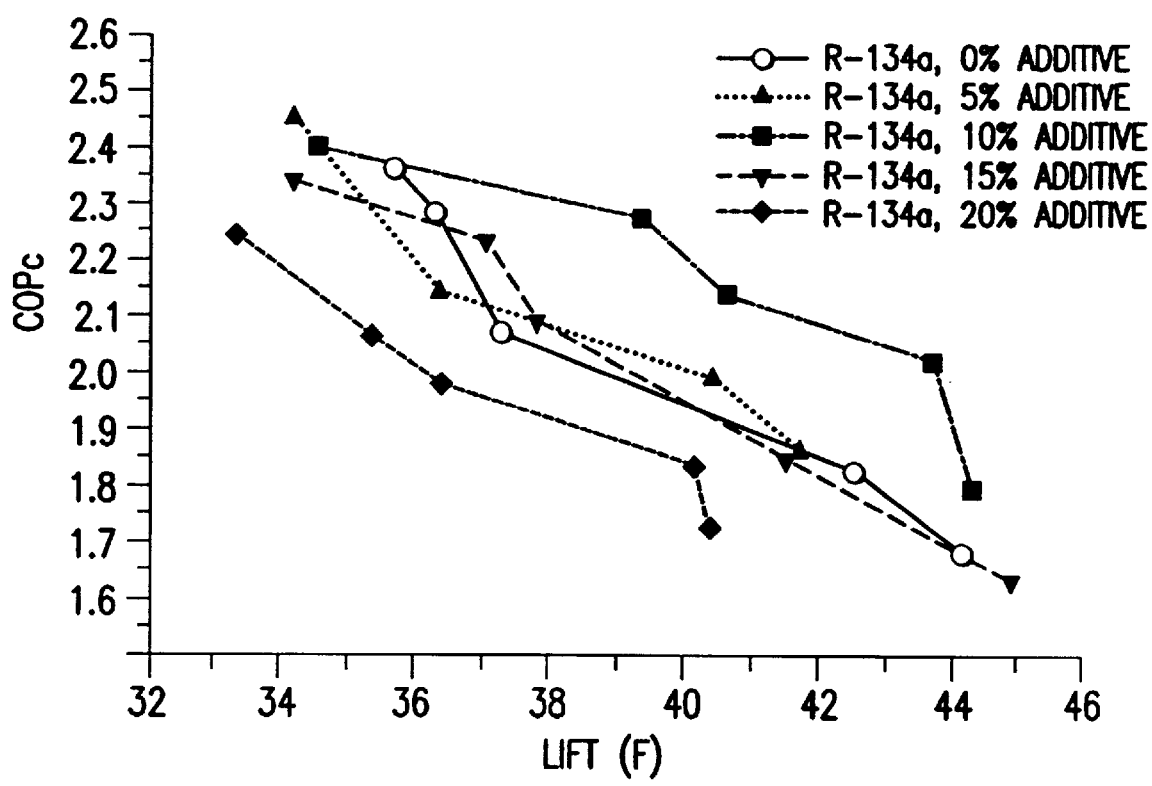
FIG. 5 is a graph showing the relationship between $COP_c$ and lift (L) for several concentrations of additive, relative to the mass of the lubricant, in connection with the present invention.
Figure 6:
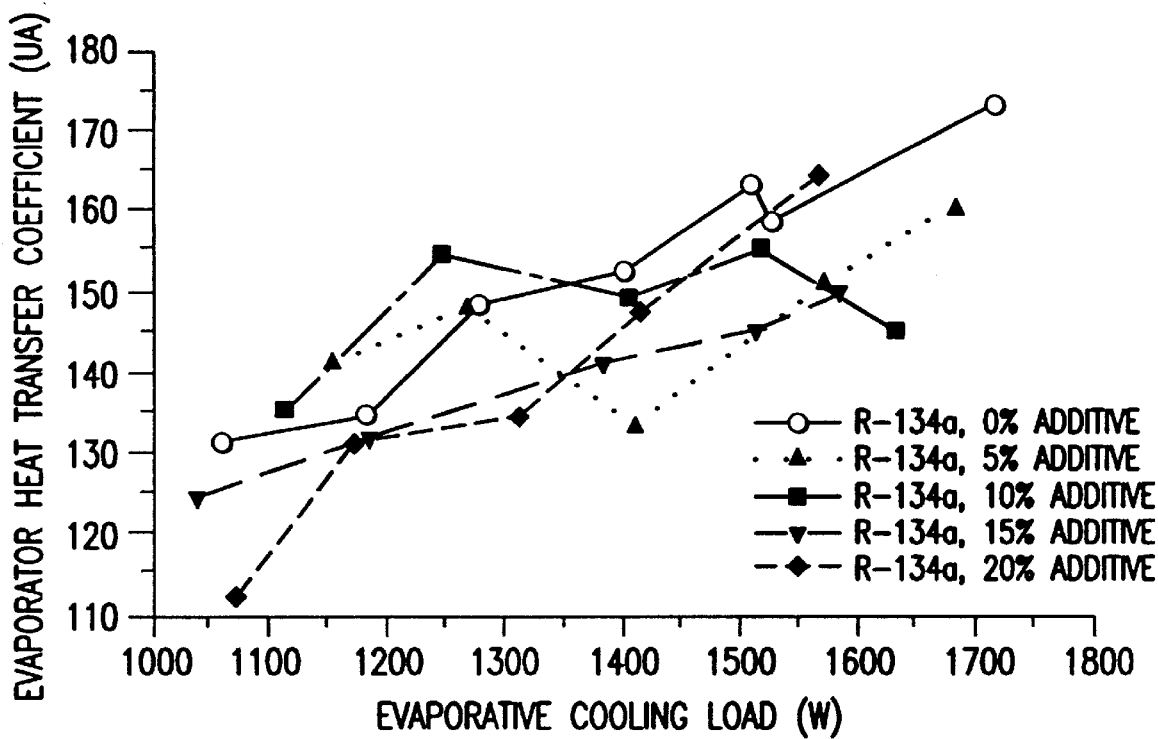
FIG. 6 is a graph showing the relationship between the evaporator heat transfer coefficient (UA) and the evaporative cooling load (W) which suggests that improvements achieved with the present invention are not associated with enhancement of evaporative heat transfer coefficient.

Referring first to FIG. 5, $COP_c$ has been plotted verses heat pump temperature lift for 0%, 5%, 10%, 15% and 20% additive concentration, as measured relative to the mass of the lubricant. Additive concentrations in the refrigerant are likely in any event in the 0–0.4% range. FIG. 6 demonstrates, however, that the introduction of the additive from 0% to 10% improves the COP significantly, by as much as 10%. A further increase in additive concentration results, however, in a decrease in performance. Both a 5% and 15% additive concentration relative to the mass of the lubricant results in a relatively insignificant change over the no-additive performance, whereas a 10% additive concentration results in a significant improvement, and a 20% additive concentration actually decreases the performance. The $COP_c$ increases by as much as 10% with the use of 10% additive concentration relative to the lubricant mass, and such a benefit clearly outweighs any benefit attributable to latent heat boost of the CMHP system or VCSC system.

We have also theorized that one or more of several potential mechanisms are responsible for improving the performance with the use of the additive, namely (1) improved heat transfer in the evaporator and/or condenser, (2) improvements in the thermodynamic compression, or (3) a latent heat boost similar to that of the CMHP. In an attempt to determine which, if any of these, mechanisms is causing the increased performance, we endeavored to determine that part of the system in which this additive was having the greatest effect.

There have been numerous studies on the effects of the lubricant on the evaporation and condensation heat transfer rates in a vapor-compression system. Although there is substantial disagreement on the effects of the lubricant, it is generally agreed that there is some slight enhancement in the evaporative heat transfer with a few weight percent lubricant, followed by a significant decrease in evaporative heat transfer as the lubricant concentration is increased further, to the point where too much lubricant being worse than with 0% lubricant.

For condensation heat transfer the effect of lubricant is generally agreed to always reduce the heat transfer. This is related to the effect of the lubricant layer on the thermal boundary layer. We theorized that perhaps here the introduction of the additive into the lubricant causes the heat transfer surfaces to be active, leading to nucleation (i.e., the formation of bubbles on heat transfer surfaces) and microconvection effects which significantly increase the heat transfer. The desorption of refrigerant from the additive on the tube walls of the evaporator was viewed as a way of achieving a microconvention type of disruption of the thermal boundary layer resulting in enhanced heat transfer and thereby improved performance and capacity.

By referring to FIG. 6, however, it is clear that the evaporative heat transfer coefficient has not been enhanced, and therefore enhanced evaporative heat transfer is not a mechanism present in this system and is not the cause for the improved COP. On one hand, the heat transfer increases with cooling load, but, there is, on the other hand, no significant difference between the various additive concentrations.

Figure 7:
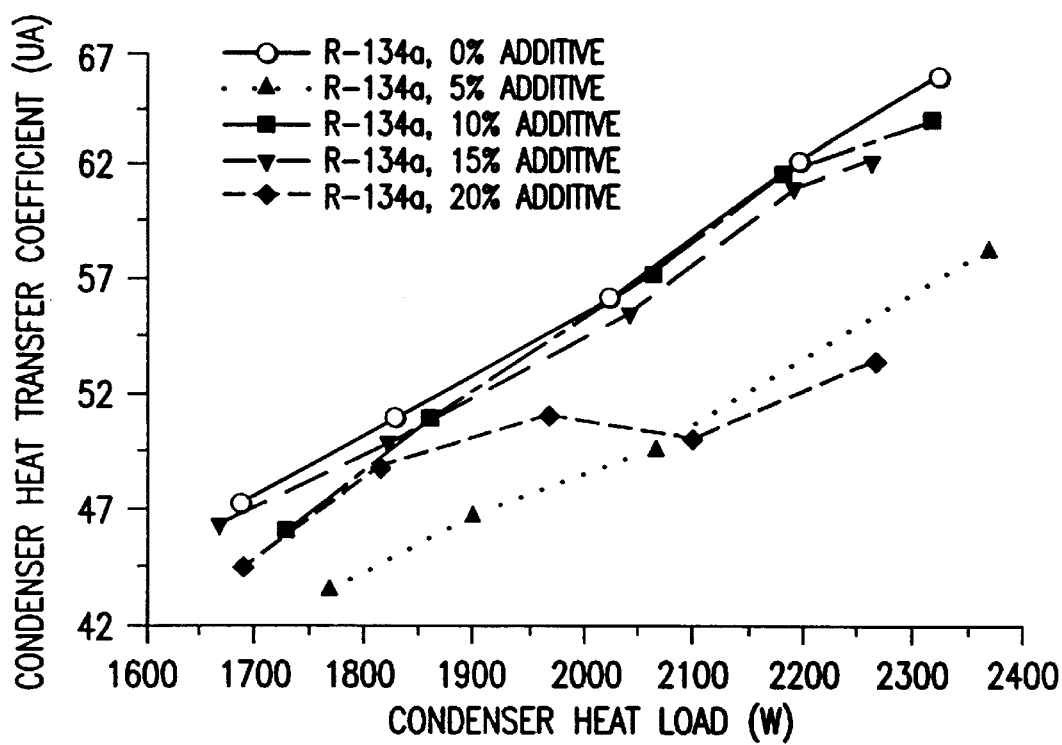
FIG. 7 is a graph showing the relationship between condenser heat transfer coefficient (UA) and condenser heat load (W) which suggests that the improvements achieved with the present invention are not associated with increases in the condenser heat transfer coefficient.

Likewise, we considered that the absorption of refrigerant (into the additive) on the tube walls of the condenser might result in a micro-convention type of disruption of the thermal boundary layer resulting in enhanced heat transfer. FIG. 7 shows that the additive does not increase heat transfer coefficient in the condenser.

Figure 8:
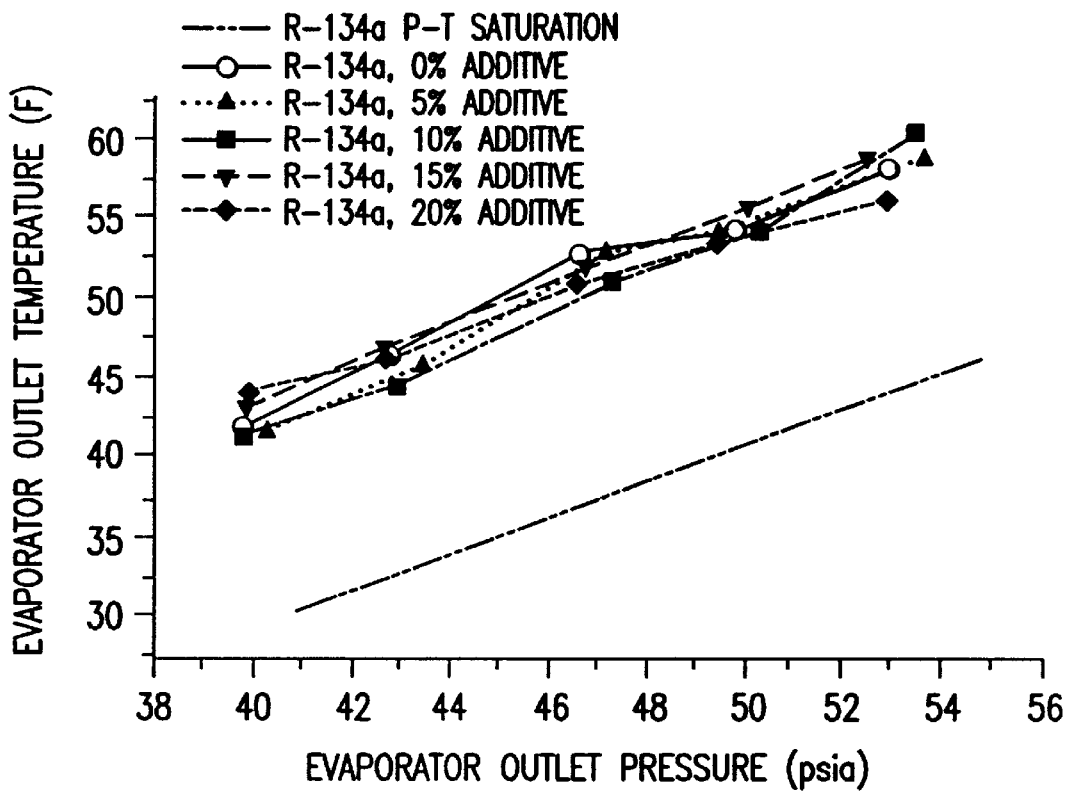
FIG. 8 is a graph showing the relationship between evaporator outlet temperature (T) and evaporator outlet pressure which suggests that the improvements achieved with the present invention are not associated with a boost in latent heat.

Augmentation of the latent heat in the evaporator was also considered as a candidate in causing a significant performance boost in the CMHP and the VCSC, but the additive concentration is too insignificant in this system to provide a significant latent heat boost as demonstrated in FIG. 8 which plots evaporator outlet temperature verses evaporator outlet pressure for various additive concentrations from 0% to 20% measured relative to the mass of the lubricant. The pressure temperature behavior is essentially identical for all concentrations of additives indicating negligible P-T-x behavior in the evaporator. In other words, the additive concentration is so low in the evaporator that deviation from the saturated single-component pressure-temperature behavior is minimal. Therefore, we concluded that the boost in latent heat would also be minimal.

The other postulated mechanism for this unexpected dramatic COP boost was an improvement in the thermodynamic compression process. The additive results in a lower compression work, that is, a lower compressor pressure ratio and pressure difference for the same lift as seen in FIGS. 9, 10, and 11.

Figure 9:
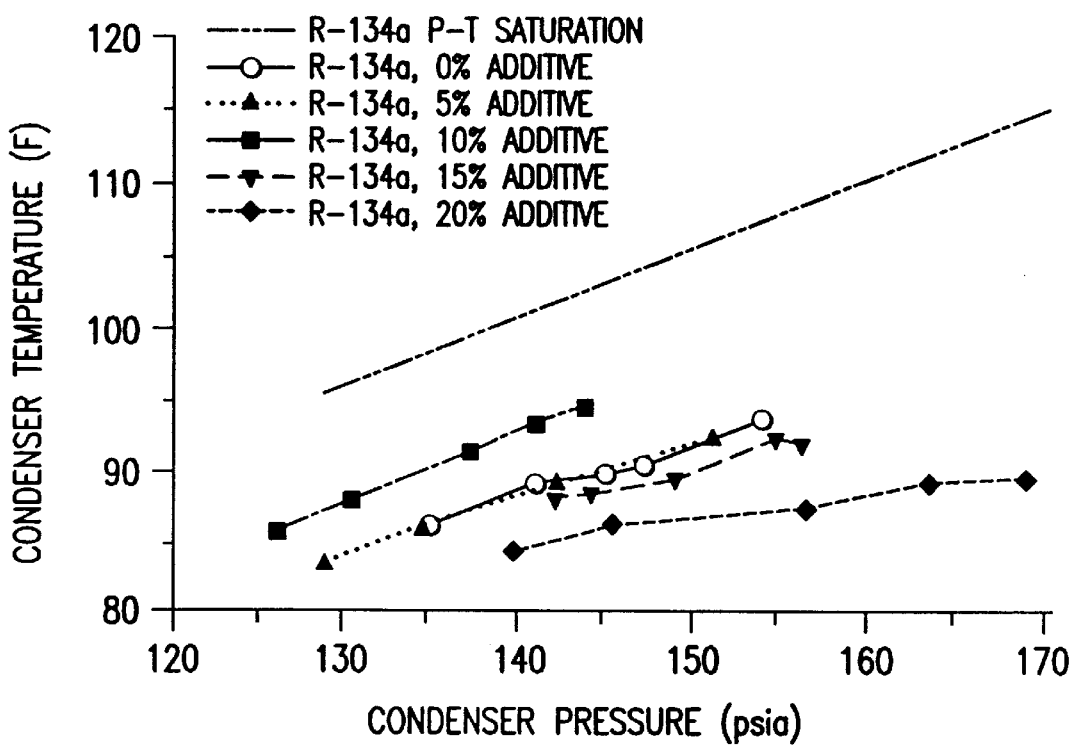
FIG. 9 is a graph showing the relationship between condenser outlet temperature (F) and condenser pressure in connection with the present invention.

FIG. 9 plots condenser outlet temperature versus condenser pressure for various additive concentrations measured relative to the mass of the lubricant from 0% to 20%. The curve for 10% additive which produced the COP boost has a lower condenser pressure for a given condenser temperature than any of the other concentrations tested. The curve for 20% additive, which had the lowest COP of the additive concentrations tested, has the highest condenser pressures. The curves for 0%, 5%, and 15% additive have similar pressure/temperature behavior and similar COP.

Figure 10:
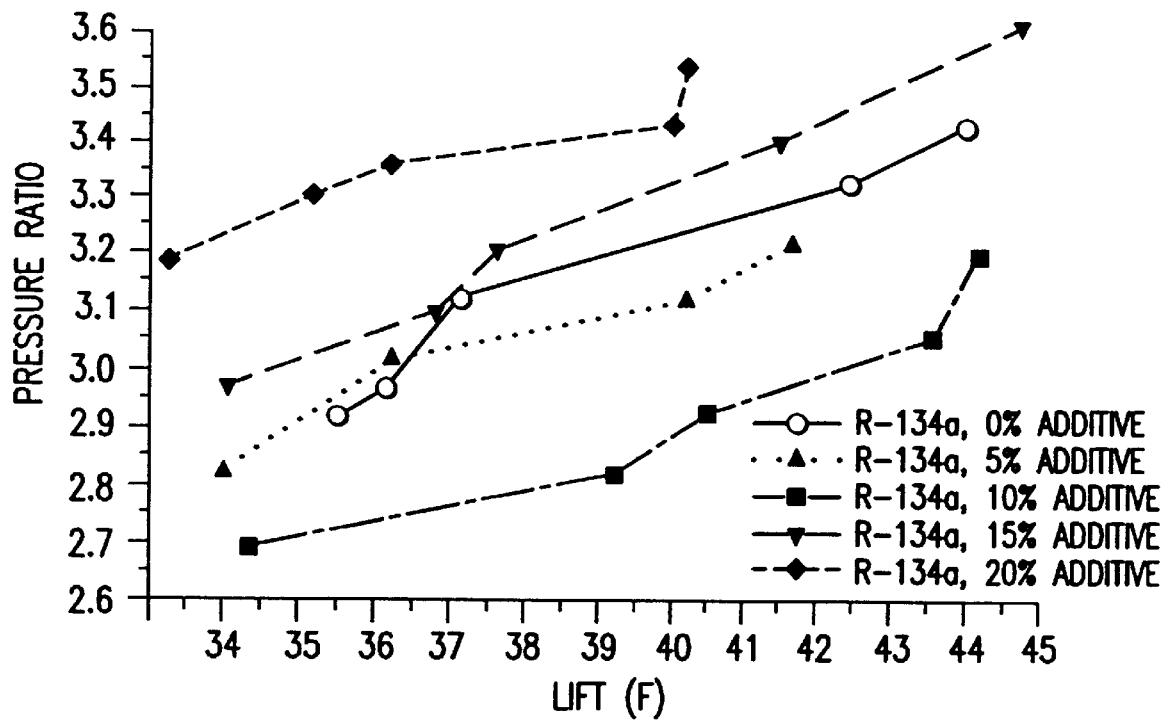
FIG. 10 is a graph showing the relationship between pressure ratio and the lift (L) in connection with the present invention.
Figure 11:
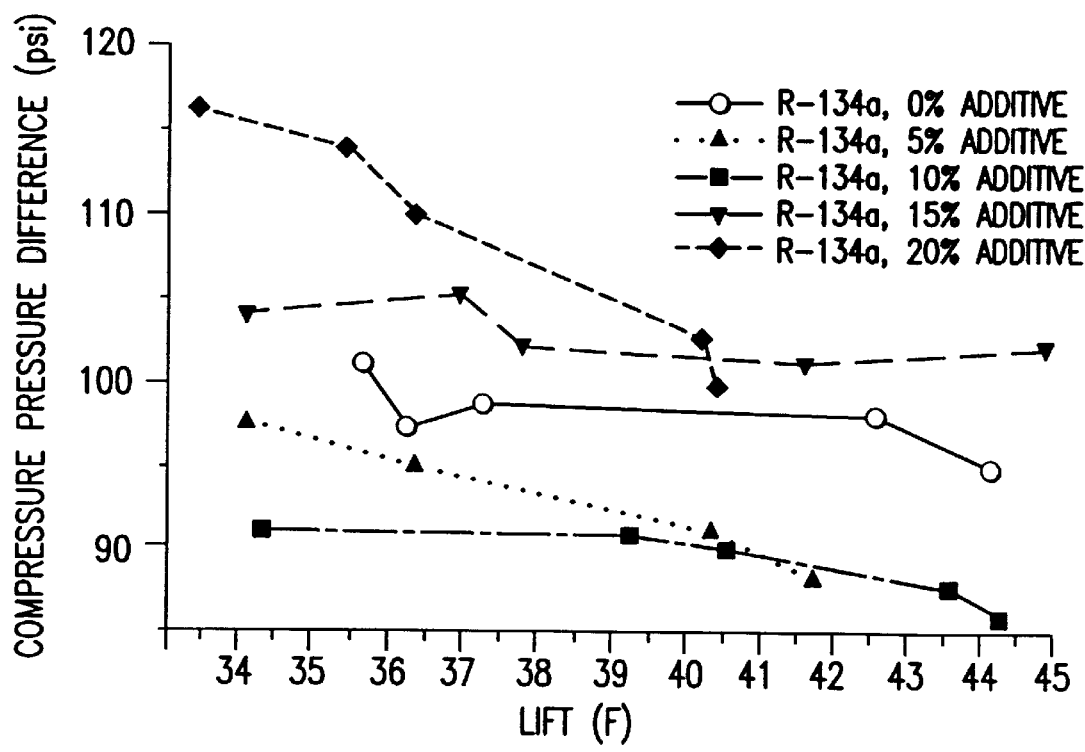
FIG. 11 is a graph showing the relationship between compressor pressure differences and the lift (L) in connection with the present invention.

In FIG. 10, the compressor pressure ratio (compressor discharge pressure/compressor suction pressure) is plotted verses heat pump temperature lift. It is clear that the 10% additive case results in significantly reduced pressure ratio. Likewise, in FIG. 11, the 10% additive case clearly results in a significantly reduced compressor pressure difference (compressor discharge pressure minus compressor suction pressure). These reductions in pressure for the same temperature lift result in improved performance and, because the compressor motor power is fixed, these reductions result in improved capacity.

It is critical to point out that, in this vapor-compression (VC) system operating with the additive according to the present invention, the pressure difference has decreased (relative to a pure refrigerant system) and the pressure ratio has also decreased. In contrast thereto, the above described CMHP or VCSC pressure difference decreased relative to a pure refrigerant system but the pressure ratio increased relative to a pure refrigerant system. The increased pressure ratio with a reduction in pressure difference occurs in both CMHP and VCSC cycles because of a lowering of both the inlet (suction) and outlet (discharge) pressures, thereby increasing the pressure ratio.

Figure 12:
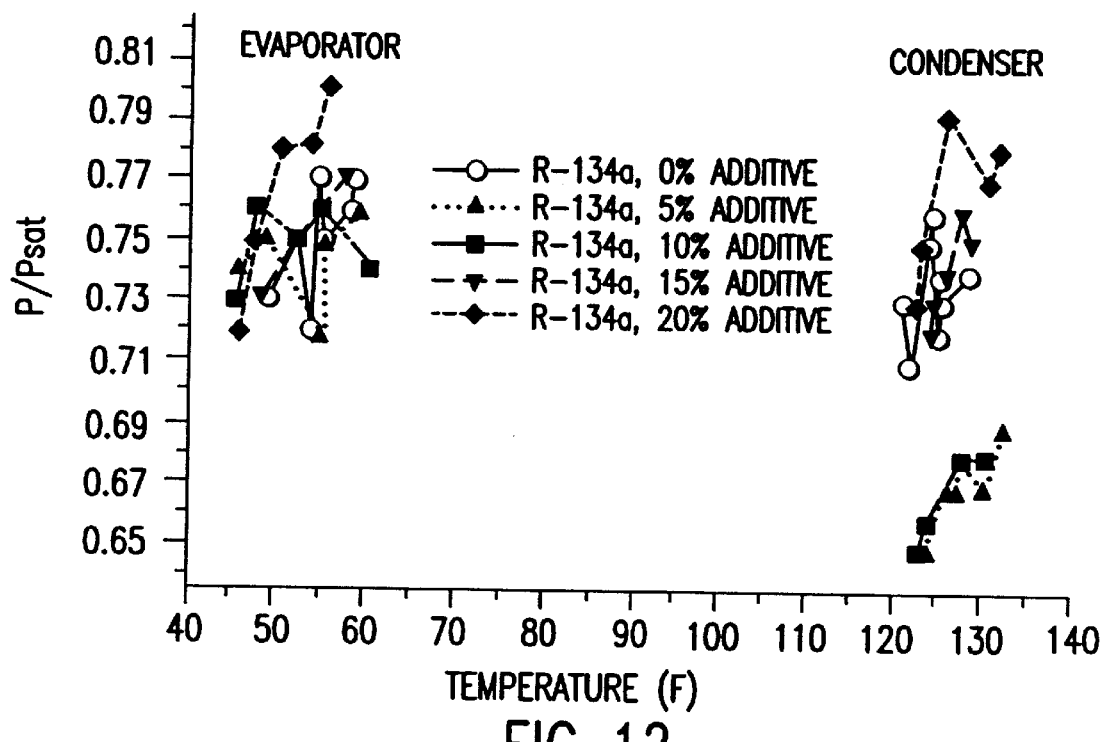
FIG. 12 is a graph showing the relationship between a ratio of $P/P_{sat}$ and temperature in connection with the present invention.

The additive of the present invention improves COP and increases capacity by lowering the compressor discharge pressure without also lowering the compression suction pressure and thus lowering the compressor pressure ratio and compressor pressure difference. FIG. 12 plots $P/P_{sat}$ versus temperature for the various compressor inlet (suction) and compressor outlet (discharge) conditions encountered in a heat pump operating under the conditions and performance cited earlier. P is the actual pressure, and $P_{sat}$ is the pressure of a pure refrigerant at the same temperature. Of course, it will be understood that a heat pump can be used under conditions other than those discussed here, but the present invention will be applicable to the those conditions as well.

With the exception of the 20% case, the $P/P_{sat}$ values at the suction-side (inlet) of the compressor are tightly grouped and statistically independent of the additive concentration, indicating a negligible variation of inlet pressure (P) from the saturation pressure of pure refrigerant ($P_{sat}$) as the additive concentration is changed. At the compressor discharge, however, only the 0% and 15% concentrations are tightly grouped. The 20% concentration, again as with the inlet case, has a higher value (meaning a higher discharge pressure which is undesirable and lowers performance), while the 5% and 10% concentrations have a lower (more desirable) discharge pressure. This lower discharge pressure may be at least one reason for the improved COP. The 5% and 10% additive examples clearly exhibit a significantly lower $P/P_{sat}$ at the compressor discharge. In turn, this lower $P/P_{sat}$ means a significantly lower discharge pressure which results in the experimentally determined reduction in compressor power, higher $COP_c$ and increased capacity.

Figure 13:
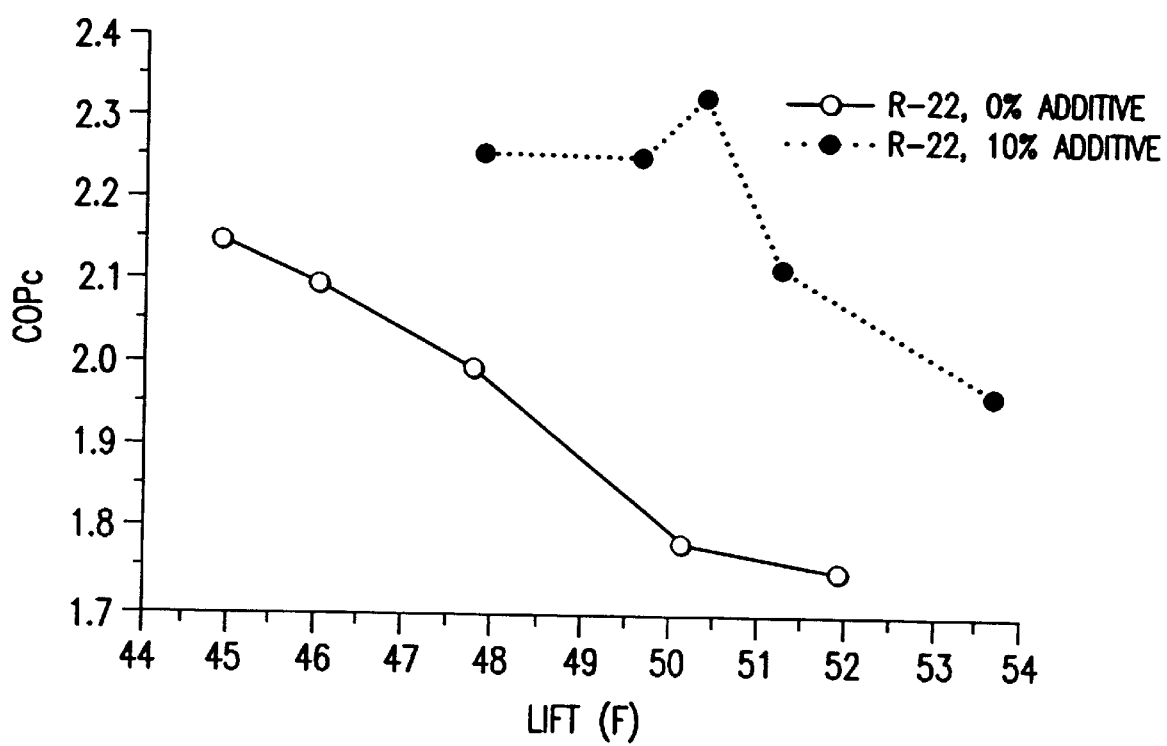
FIG. 13 is a graph showing the relationship between $COP_c$ and the lift (L) in accordance with the present invention.

Similar experiments were repeated for a refrigerant/oil system where the additive was not soluble in the refrigeration lubricant. This led to the additional discovery that solubility of the additive in the lubricant is not critical to achieve the objects of our invention. The additive was once again tetraglyme, the refrigerant for this case was HCFC-22 (chlorodifluoromethane), and the lubricant in this case was a mineral oil lubricant, Suniso 3GS. FIG. 13 plots $COP_c$ vs. temperature lift for 0% additive and 10% additive. Once again, the $COP_c$ ranges from 13% to 20% higher for the lubricant with 10% additive than without the additive. Thus, the present invention contemplates that the additive can be added anywhere in the system and does not have to be dissolved, mixed or otherwise entrained with the lubricant.

Independent lubrication tests show that the additive/lubricant mixture has lower wear properties than the lubricant or additive alone. The wear properties of pure tetraglyme, pure Mobil Arctic EAL 22CC refrigeration lubricant, and a mixture of 20% tetraglyme/80% lubricant have been determined as seen in Table 1 below. The test method used, "Evaluation of Refrigerant Lubricants," is a modification to ASTM D2670, "Standard Test Method for Measuring Wear Properties of Fluid Lubricants (known as the Falex Pin and Vee Block Method). This test method utilizes a pressurized chamber (which is pressurized in this specific illustration with refrigerant HFC-134a) for the determination of lubricating properties of refrigeration lubricants. Wear is measured as the number of ratchet teeth required to maintain a constant load during the prescribed test time, and the amount of mass loss of the specimen. Table 1 shows that the 20% tetraglyme/80% lubricant mixture had less wear than the pure POE refrigeration lubricant.

TABLE 1

Test Result Summary of Lubrication Wear Test

| Sample | Number of Teeth | Mall Loss During Test |
| --- | --- | --- |
| 100% POE Lubricant | 40 | 34.0 mg |
| 20% Tetraglyme/80% POE Lubricant | 29 | 23.7 mg |
| 100% Tetraglyme | Failure | Failure |

Note: a test result of higher mass loss and higher number of notches means more wear.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A method of using a compound of a type used as an antiabsorbent in two-phase compressor vapor compression system or absorption heat pump system, comprising the step of adding the compound in a predetermined concentration to a single-phase compressor vapor compression system.

2. The method according to claim 1, wherein the concentration of the absorbent compound is in a range greater than zero and less than 100% relative to a mass of lubricant in the system.

3. The method according to claim 1, wherein the additive is selected from a group of compound families having an atom which serves as an electron donor for hydrogen bonding with a refrigerant of the single-phase vapor compression system.

4. The method according to claim 3, wherein the compound families consist of ethers, esters, ketones, aldehydes, amines, anhydrides and amides, and exclude compound families with OH groups.

5. The method according to claim 3, wherein the refrigerant is a halogenated hydrocarbon having at least one hydrogen atom.

6. The method according to claim 1, wherein the additive is selected from a group of compounds consisting of tetraglyme, triethylene glycol dimethyl ether, diethylene glycol diethyl ether, butyric anhydride, tetramethylurea, ethylene glycol diacetate, N,N-dimethylformamide, N,N-dimethylacetamide, N,N-diethylformamide, or 2-octanone.

7. The method according to claim 6, wherein the additive is added to the system in a concentration in a range greater than zero and less than 100% relative to a mass of lubricant in the system.

8. The method according to claim 7, wherein a refrigerant in the system is a halogenated hydrocarbon having at least one hydrogen atom.

9. The method according to claim 1, wherein the additive is selected from a group of compound families having an atom available as an electron donor for hydrogen.

10. The method according to claim 1, wherein the compound is selected from a group of absorbents used in two-phase vapor compression or absorption heat pump systems.

11. The method according to claim 10, wherein the concentration of the compound is in a range of greater than zero and less than 100% relative to a mass of lubricant in the system.

12. The method according to claim 10, wherein the additive is selected from a group of compound families having an atom which serves as an electron donor for hydrogen bonding with a refrigerant of the single-phase vapor compression system.

13. The method according to claim 12, wherein the compound families consist of ethers, esters, ketones, aldehydes, amines, anhydrides and amides, and exclude compound families with OH groups.

14. The method according to claim 12, wherein the refrigerant is a halogenated hydrocarbon having at least one hydrogen atom.

15. The method according to claim 10, wherein the compound is selected from a group of compounds consisting of tetraglyme, triethylene glycol dimethyl ether, diethylene glycol diethyl ether, butyric anhydride, tetramethylurea, ethylene glycol diacetate, N,N-dimethylformamide, N,N-dimethylacetamide, N,N-diethylformamide, or 2-octanone.

16. In the vapor compression system having a single-phase compressor, an additive being provided in the system in a predetermined concentration for lowering thermodynamic load on the compressor, the additive being selected from a group of compound families having an atom which served as an electron donor for hydrogen bonding with a refrigerant of the vapor compression system.

17. In the vapor compression system according to claim 16, the compound familes consisting of ethers, esters, ketones, aldehydes, amines, anhydrides ad amides, and exclude compound families with OH groups.

18. In the vapor compression system according to claim 16, the refrigerant being a halogenated compound having at least one hydrogen atom.

19. In the vapor compression system according to claim 10, the additive being selected from a group of compounds consisting of tetraglyme, triethylene glycol dimethyl ether, dicthylene glycol, dimethyl ether, butyric anhydride, tetramethylurea, ethylene glycol diacetate, N,N-dimethyl formamide, N,N-dimethyl acetamide, N,N-diethylformamide, or 2-octanone.

20. In the vapor compression system according to claim 19, the concentration being in a range greater than zero and loss than 100% relative to amass of lubricant in the system.

21. In the vapor compression system according to claim 20, wherein the refrigerant in the system is a halogenated hydrocarbon having at lease one hydrogen atom.

* * * * *

UNITED STATES PATENT AND TRADEMARK OFFICE
CERTIFICATE OF CORRECTION

PATENT NO. : 5,826,436
DATED : October 27, 1998
INVENTOR(S) : ROBERT P. SCARINGE ET AL It is certified that error appears in the above-identified patent and that said Letters Patent is hereby corrected as shown below:

Column 9, line 44, "antiabsorbent" should read
-- an absorbent --.

Column 10, line 42, "namic:" should read
-- namic -- .

Column 10, line 62, "loss" should read
-- less --.

Signed and Sealed this

Twenty-second Day of May, 2001

Attest:

NICHOLAS P. GODICI

Attesting Officer    Acting Director of the United States Patent and Trademark Office